United States Patent
Xu et al.

(10) Patent No.: US 10,383,100 B2
(45) Date of Patent: *Aug. 13, 2019

(54) METHOD AND DEVICE FOR TRANSMITTING UPLINK AND DOWNLINK CONFIGURATION INFORMATION

(71) Applicant: China Academy of Telecommunications Technology, Beijing (CN)

(72) Inventors: Jing Xu, Beijing (CN); Xueming Pan, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 9 days.

This patent is subject to a terminal disclaimer.

(21) Appl. No.: 14/781,867

(22) PCT Filed: Feb. 26, 2014

(86) PCT No.: PCT/CN2014/072534
§ 371 (c)(1),
(2) Date: Oct. 1, 2015

(87) PCT Pub. No.: WO2014/161406
PCT Pub. Date: Oct. 9, 2014

(65) Prior Publication Data
US 2016/0037492 A1 Feb. 4, 2016

(30) Foreign Application Priority Data
Apr. 3, 2013 (CN) .......................... 2013 1 0116409

(51) Int. Cl.
*H04W 72/04* (2009.01)
*H04L 5/14* (2006.01)

(52) U.S. Cl.
CPC ............ *H04W 72/042* (2013.01); *H04L 5/14* (2013.01)

(58) Field of Classification Search
CPC .............................. H04W 72/042; H04L 5/14
See application file for complete search history.

(56) References Cited

U.S. PATENT DOCUMENTS 10,003,445 B2 * 6/2018 Ratasuk ................ H04L 5/0053
10,122,518 B2 * 11/2018 Lee ....................... H04L 5/0044
(Continued)

FOREIGN PATENT DOCUMENTS

CN     102740477     10/2012
CN     102958058     3/2013
(Continued)

OTHER PUBLICATIONS

Xueming, Pan, Information Sending and Blind Detection Method and Device, Nov. 7, 2011.*
(Continued)

*Primary Examiner* — Tejis Daya
(74) *Attorney, Agent, or Firm* — Foley & Lardner LLP (57) ABSTRACT

Disclosed are an uplink and downlink configuration information transmission method and device. The method comprises: a network device generating DCI containing TDD uplink and downlink configuration information; the network device use one PDCCH or one EPDCCH to bear the DCI containing the TDD uplink and downlink configuration information; and the network device sending the PDCCH or the EPDCCH in at least one subframe in a predetermined subframe set.

18 Claims, 4 Drawing Sheets

(56) References Cited

U.S. PATENT DOCUMENTS

| | | | |
|---|---|---|---|
| 2010/0165939 A1* | 7/2010 | Lin | H04L 5/0053 370/329 |
| 2011/0076962 A1* | 3/2011 | Chen | H04L 5/001 455/68 |
| 2012/0147794 A1* | 6/2012 | Chung | H04L 5/0057 370/280 |
| 2012/0257552 A1 | 10/2012 | Chen et al. | |
| 2013/0010737 A1* | 1/2013 | Ng | H04W 72/042 370/329 |
| 2013/0044651 A1* | 2/2013 | Wang | H04W 72/0406 370/280 |
| 2013/0188516 A1* | 7/2013 | He | H04W 28/16 370/254 |
| 2013/0242823 A1* | 9/2013 | Lin | H04B 7/2656 370/280 |
| 2013/0315114 A1* | 11/2013 | Seo | H04L 5/001 370/280 |
| 2013/0336302 A1* | 12/2013 | Lee | H04L 5/001 370/336 |
| 2014/0029486 A1* | 1/2014 | Li | H04L 5/1469 370/280 |
| 2014/0044056 A1* | 2/2014 | Chen | H04W 72/04 370/329 |
| 2014/0086112 A1* | 3/2014 | Stern-Berkowitz | H04W 72/1289 370/280 |
| 2014/0105158 A1* | 4/2014 | Kim | H04W 72/042 370/329 |
| 2014/0161090 A1* | 6/2014 | Lee | H04L 1/1822 370/329 |
| 2014/0301341 A1* | 10/2014 | Pan | H04L 1/0026 370/329 |
| 2015/0085787 A1* | 3/2015 | Ouchi | H04L 5/0037 370/329 |
| 2015/0250017 A1* | 9/2015 | Ingale | H04B 7/2615 370/280 |
| 2015/0312936 A1* | 10/2015 | Nguyen | H04L 1/0061 370/280 |

FOREIGN PATENT DOCUMENTS

| | | |
|---|---|---|
| EP | 2461608 | 6/2012 |
| JP | 2015534733 A | 12/2015 |
| KR | 10-2012-0043031 A | 5/2012 |
| KR | 10-2013-0032798 A | 4/2013 |
| WO | WO-2013/024335 | 2/2013 |
| WO | WO-2013042991 | 3/2013 |
| WO | WO-2014057604 | 4/2014 |

OTHER PUBLICATIONS

Nguyen et al., TDD reconfiguration indication signalling in a wireless communications network, Nov. 14, 2012.*
Li et al., Equipment for Subframe Configuration in Time Division Duplex System, Mar. 31, 2011.*
Huawei et al., Signaling mechanisms for TDD eIMTA, Apr. 15, 2013, 3GPP TSG RAN WG1 Meeting #72bis, R1-130883.*
Qualcomm, Signalling Mechanisms for TDD UL-DL Reconfiguration, 3GPP TSG-RAN WG1 #73, R1-132488.*
International Search Report for PCT/CN2014/072534 dated May 16, 2014.
Extended European Search Report for EP Application No. 14778519.0 dated Jan. 26, 2016.
Samsung: "Dynamic reconfiguration of TDD UL-DL configuration", 3GPP Draft; R1-122267 Dynamic Reconfiguration of TDD UL-DL Configuration, 3rd Generation Partnership Project (3GPP), Mobile Competence Centre ; 650, Route Des Lucioles ; F-06921 Sophia-Antipolis Cedex ; France, vol. RAN WG1, no. Prague, Czech Republic; May 21, 2012-May 25-2012, May 12, 2012 (May 12, 2012), XP050600530, [retrieved on May 12, 2012].
Samsung, "Dynamic reconfiguration of TDD UL-DL configuration," 3GPP TSG RAN WG1 Meeting #69, R1-122267, Prague, Czech Republic, May 21-25, 2012, retrieved from http://www.3gpp.org/ftp/tsg_ran/WG1_RL1 /TSGR1_69/Docs/R1-122267.zip.
New Postcom, "Discussion on different signalling mechanisms for TDD UL-DL reconfiguration," 3GPP TSG RAN WG1 Meeting #72 R1-130163, St. Julian's, Malta, Jan. 28-Feb. 1, 2013, retrieved from http://www.3gpp.org/ftp/tsg_ran/WG1_RL1/TSGR1_72/Docs/R1-130163.zip.
Pantech, "Discussion on signaling methods for TDD UL-DL reconfiguration,"3GPP TSG RAN1 #72 R1-130524, St. Julian's, Malta, Jan. 28-Feb. 1, 2013, retrieved from http://www.3gpp.org/ftp/tsg_ran/WG1_RL1 /TSGR1_72/Docs/R1-130524.zip.
R2-130052, "Signalling mechanisms for TDD UL-DL reconfigurations", CATT, 3GPP TSG, RAN WG1 Meeting #72, St. Julian's, Malta, Jan. 28-Feb. 1, 2013. (4 pages).
ETSI TS 136211, "Evolved Universal Terrestrial Radio Access (E-ULTRA)", 3GPP TS, 36,211 version 10.00.0 Release 10), pp. 105.
ETSI TS 136213, "Evolved Universal Terrestrial Radio Access (E-ULTRA)", 3GPP TS, 36,213 version 14.4.0.0 Release 14), pp. 464.
"LTE; Evolved Universal Terrestrial Radio Access (E-UTRA); Physical layer procedures (3GPP TS 36.213 version 14.4.0 Release 14)" ETSI TS 136 213 V14.4.0 (Oct. 2017),Cedex—France(pp. 1-464).
Chinese Office Action of Appl. No. CN201310116409.5 dated Jan. 3, 2018.

* cited by examiner

METHOD AND DEVICE FOR TRANSMITTING UPLINK AND DOWNLINK CONFIGURATION INFORMATION

The present application is a US National Stage of International Application No. PCT/CN2014/072534, filed Feb. 26, 2014, designating the United States, and claiming the benefit of Chinese Patent Application No. 201310116409.5, filed with the State Intellectual Property Office of People's Republic of China on Apr. 3, 2013 and entitled "Method and device for transmitting uplink-downlink configuration information", which is hereby incorporated by reference in its entirety.

FIELD

The present disclosure relates to the field of communications and particularly to a method and device for transmitting uplink-downlink configuration information.

BACKGROUND

Downlink Control Information (DCI) is carried over a Physical Downlink Control Channel (PDCCH) to effectively transmit uplink or downlink scheduling information and related common control information. 10 DCI formats have been defined so far in the Long Term Evolution (LTE) system. Main functions of the respective DCI formats can be as depicted in Table 1. Moreover in a DCI channel encoding procedure, firstly a Cyclic Redundancy Check (CRC) is performed on and CRC information is added to DCI bits, and then the CRC information is scrambled by a Radio Network Temporary Identifier (RNTI), and next the DCI bits are channel-encoded, and the channel-encoded DCI bits are matched in rate.

TABLE 1

| DCI format | Function |
|---|---|
| 0 | For scheduling of a Physical Uplink Shared Channel (PUSCH) |
| 1 | For scheduling of Physical Downlink Shared Channel (PDSCH) of a downlink single code word |
| 1A | For compact scheduling of a PDSCH of a downlink single code word |
| 1B | For compact scheduling of a PDSCH of a pre-coded downlink single code word |
| 1C | For a more compact scheduling of a PDSCH of a downlink single code word |
| 1D | For compact scheduling of a PDSCH of a downlink single code word with pre-coding and power offset information |
| 2 | For scheduling of a PDSCH of double code words in closed-loop spatial multiplexing |
| 2A | For scheduling of a PDSCH of double code words in open-loop spatial multiplexing |
| 3 | Power control information for transmitting Physical Uplink Control Channels (PUCCHs) and PUSCHs of a group of users, where the power control information is indicated in 2 bits |
| 3A | Power control information for transmitting PUCCHs and PUSCHs of a group of users, where the power control information is indicated in 1 bit |

These DCI formats are further categorized into four categories dependent upon their functions: DCI formats for uplink PUSCH scheduling. e.g., the DCI format 0; DCI formats for downlink PDSCH scheduling, e.g., the DCI formats 1, 1A, 1B, 1D, 2 and 2A; DCI formats for scheduling common control information, e.g., the DCI formats 1A and 1C; and DCI formats for scheduling group-cast power control information, e.g., the DCI formats 3 and 3A.

Figure 1:
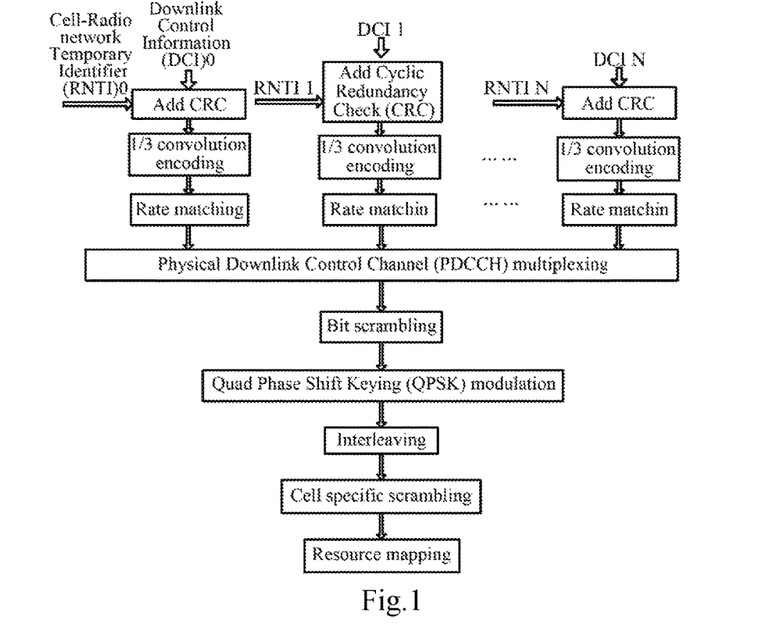
FIG. 1 is a schematic diagram of the handling procedure at the physical layer in the prior art.

The PDCCH is configured to carry DCI including scheduling information, uplink power control information, etc., for downlink and uplink data transmission. FIG. 1 illustrates a physical layer handling procedure of the PDCCH. The PDCCH is design by sharing a resource among a number of user equipments, a user equipment needs to search the entire control region of a downlink sub-frame for control signaling under some rule. In the DCI carried over the PDCCH, a Cell-Radio Network Temporary Identifier (C-RNTI) of the user equipment is scrambled onto a 16-bits CRC sequence to identify implicitly the destination user equipment to which the DCI is transmitted. In a downlink sub-frame, a number of pieces of DCI are encoded and rate-matched parallelly, and the encoded bits are multiplexed and then scrambled, modulated, interleaved, etc., together.

In order to support link adaptation and to low the complexity of detection by the user equipment as much as possible, mapping of PDCCH resources is designed per Control Channel Element (CCE), where a CCE is consisted of nine Resource Element Groups (REGs), i.e., 36 Resource Elements (REs). Furthermore a base station can select 1, 2, 4 or 8 CCEs to carry a piece of DCI dependent upon the length of carried DCI bits and a channel condition, where 1, 2, 4 or 8 is referred to as a CCE aggregation level, for example, 1 is referred to as a CCE aggregation level 1. The user equipment searches the control region for both the starting position of the CCEs where the DCI is located and the CCE aggregation level applied to the base station, and this procedure will be referred to PDCCH blind detection.

Figure 2:
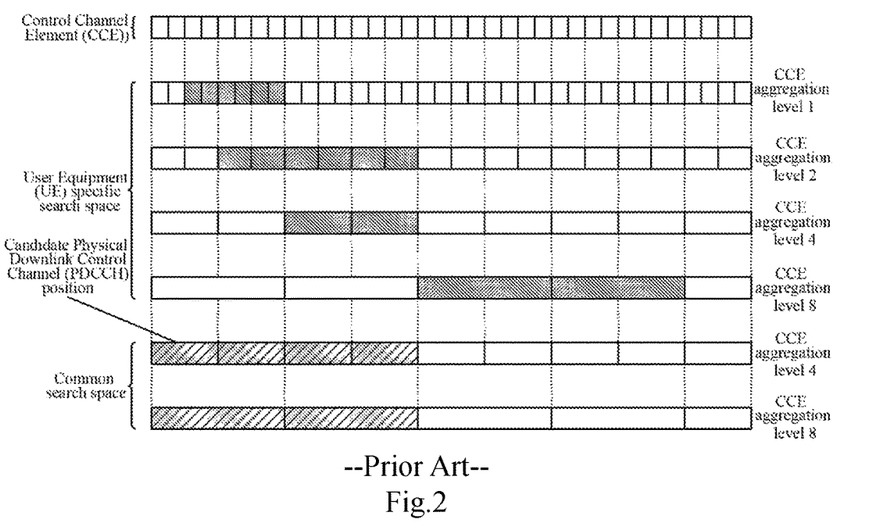
FIG. 2 is a schematic diagram of PDCCH blind detection in the prior art.

The set of CCE resources for which the user equipment performs PDCCH blind detection will be referred to as a PDCCH search space, where a common search space and a specific search space are defined in the standard. The common search space is shared by all the user equipments in a cell, and starts from the first CCE in a sub-frame. The user equipment needs to be attempt on the CCE aggregation levels 4 and 8 in the common search space. The specific search space specific to each user equipment involves all the possible CCE aggregation levels. At a CCE aggregation level, the starting position of the specific search space of the user equipment is determined jointly by the sub-frame number, the RNTI of the user equipment, etc., and FIG. 2 illustrates a schematic diagram of PDCCH blind detection. Additionally the number of candidate PDCCH positions for which the user equipments needs to perform blind detection is further defined in the standard as depicted in Table 2. For each of the candidate PDCCH position, the user equipment needs to attempt on decoding DCI of two different types of lengths, so the user equipment needs to perform a total number 44 of times of blind detection in a downlink sub-frame.

TABLE 2

| Type of search space | Candidate CCE aggregation level | Candidate PDCCH position | Number of times of blind detection |
|---|---|---|---|
| Specific search space | 1 | 6 | 12 |
|  | 2 | 6 | 12 |
|  | 4 | 2 | 4 |
|  | 8 | 2 | 4 |
| Common search space | 4 | 4 | 8 |
|  | 8 | 2 | 4 |
| Total | N/A (Not Available) | 22 | 44 |

Figure 3:
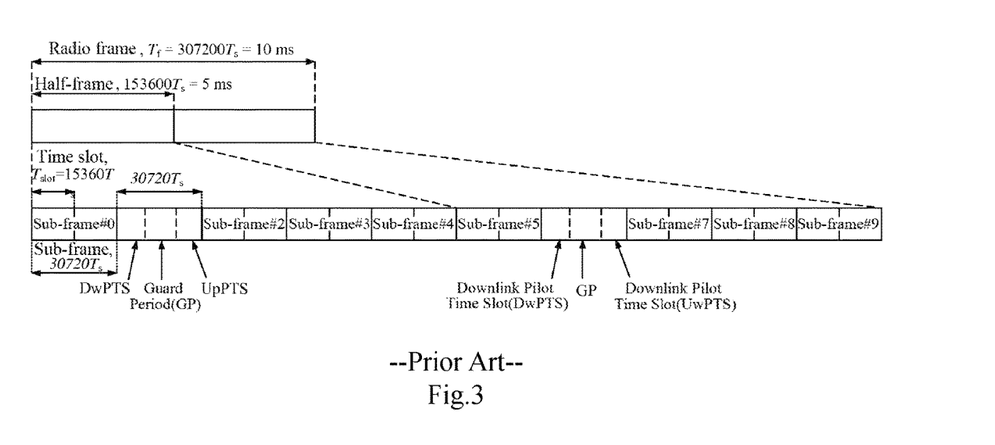
FIG. 3 is a schematic diagram of a frame structure in the LTE TDD system in the prior art.

In a Time Division Duplex (TDD) system, the same frequency resources are applied to uplink and downlink transmission, and an uplink or downlink signal is transmitted in different time slots. FIG. 3 illustrates a frame structure in the LTE TDD system, where seven uplink-downlink configurations as depicted in Table 3 are supported in an uplink-downlink sub-frame allocation scheme.

TABLE 3

| Uplink-downlink configu­ration | Downlink-to-Uplink Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

As the technologies are developing rapidly, an increasing number of small cells, home eNBs and other low-power eNBs have been deployed for local coverage, and cells covered by the low-power eNBs will be referred to small cells. There are a smaller number of user equipments with a significantly varying service demand in the small cells, so there will be such a situation that an uplink-downlink service proportion required of the small cells may vary dynamically. In view of this, the base station needs to indicate the TDD uplink-downlink configuration information frequently to the user equipment, but a solution to indicating the TDD uplink-downlink configuration information to the user equipment has been absent in the prior art.

SUMMARY

Embodiments of the disclosure provide a method and device for transmitting uplink-downlink configuration information so as to indicate TDD uplink-downlink configuration information to a user equipment and to improve the accuracy of DCI detection.

An embodiment of the disclosure provides a method for transmitting uplink-downlink configuration information, the method including:

generating, by a network device, Downlink Control Information (DCI) comprising Time Division Duplex (TDD) uplink-downlink configuration information;

carrying, by the network device, the DCI comprising the TDD uplink-downlink configuration information in a Physical Downlink Control Channel (PDCCH) or an Enhanced Physical Downlink Control Channel (EPDCCH); and transmitting, by the network device, the PDCCH or the EPDCCH in at least one of a predetermined set of sub-frames.

Generating, by the network device, the Downlink Control Information (DCI) including the Time Division Duplex (TDD) uplink-downlink configuration information includes:

generating, by the network device, the DCI including the TDD uplink-downlink configuration information by indicating the TDD uplink-downlink configuration information in a plurality of bits in the DCI.

The DCI further includes X preset bits other than the plurality of bits, wherein the total length, of the X preset bits and the plurality of bits indicating the TDD uplink-downlink configuration information, is equal to the length of any one of the DCI formats 0, 1, 1A, 1B, 1C, 1D, 2, 2A, 2B, 2C, 2D, 3, 3A and 4 supported in the 3GPP E-UTRA, wherein X is greater than or equal to 1; or the DCI further includes Y preset bits other than the plurality of bits, wherein the Y preset bits indicate all the information in any one of the DCI formats 0, 1, 1A, 1B, 1C, 1D, 2, 2A, 2B, 2C, 2D, 3, 3A and 4 supported in the 3GPP E-UTRA, wherein Y is greater than or equal to 1; or the DCI further includes Z preset bits other than the plurality of bits, wherein the total length, of the Z preset bits and the plurality of bits indicating the TDD uplink-downlink configuration information, is smaller than the length of the shortest one of the DCI formats 0, 1, 1A, 1B, 1C, 1D, 2, 2A, 2B, 2C, 2D, 3, 3A and 4 supported in the 3GPP E-UTRA, wherein Z is greater than or equal to 0.

Another embodiment of the disclosure provides a method for transmitting uplink-downlink configuration information, the method including:

detecting, by a user equipment, a Physical Downlink Control Channel (PDCCH) or an Enhanced Physical Downlink Control Channel (EPDCCH) in at least one of a predetermined set of sub-frames, wherein the PDCCH or the EPDCCH carries Downlink Control Information (DCI) including Time Division Duplex (TDD) uplink-downlink configuration information; and obtaining, by the user equipment, the TDD uplink-downlink configuration information from the detected DCI.

An embodiment of the disclosure provides a network device including:

a generating module configured to generate Downlink Control Information (DCI) including Time Division Duplex (TDD) uplink-downlink configuration information;

a processing module configured to carry the DCI including the TDD uplink-downlink configuration information in a Physical Downlink Control Channel (PDCCH) or an Enhanced Physical Downlink Control Channel (EPDCCH); and a transmitting module configured to transmit the PDCCH or the EPDCCH in at least one of a predetermined set of sub-frames.

An embodiment of the disclosure provides a user equipment including:

a detecting module configured to detect a Physical Downlink Control Channel (PDCCH) or an Enhanced Physical Downlink Control Channel (EPDCCH) in at least one of a predetermined set of sub-frames, wherein the PDCCH or the EPDCCH carries Downlink Control Information (DCI) including Time Division Duplex (TDD) uplink-downlink configuration information; and an obtaining module configured to obtain the TDD uplink-downlink configuration information from the detected DCI.

In the embodiments of the disclosure, the network device indicates the TDD uplink-downlink configuration information to the user equipment in the DCI, and prescribes that the plurality of bits in the DCI indicate the TDD uplink-downlink configuration information, so that the user equipment can detect the DCI in the maximum likelihood algorithm with lower complexity of the maximum likelihood algorithm and improved accuracy of DCI detection, and thus the user equipment can apply the maximum likelihood algorithm for optimum detection performance. Furthermore the DCI in the PDCCH or the EPDCCH can be mapped to the physical resources including the REs to thereby lower the complexity in searching by the user equipment for the specific DCI so as to improve the efficiency of the search.

BRIEF DESCRIPTION OF THE DRAWINGS

In order to make the technical solutions of the disclosure more apparent, the drawings to which reference is made in the description of the embodiments will be described below briefly, and apparently the drawings in the description below merely illustrate some embodiments of the disclosure, but those ordinarily skilled in the art can further derive from these drawings other drawings without any inventive effort. In the drawings.

DETAILED DESCRIPTION OF THE EMBODIMENTS

The technical solutions in the disclosure will be described below clearly and fully with reference to the drawings in the disclosure, and apparently the embodiments to be described below are only a part but not all of the embodiments of the disclosure. All the other embodiments that can be derived by those ordinarily skilled in the art based upon the embodiments here of the disclosure without any inventive effort shall fall into the claimed scope of the disclosure.

Figure 4:
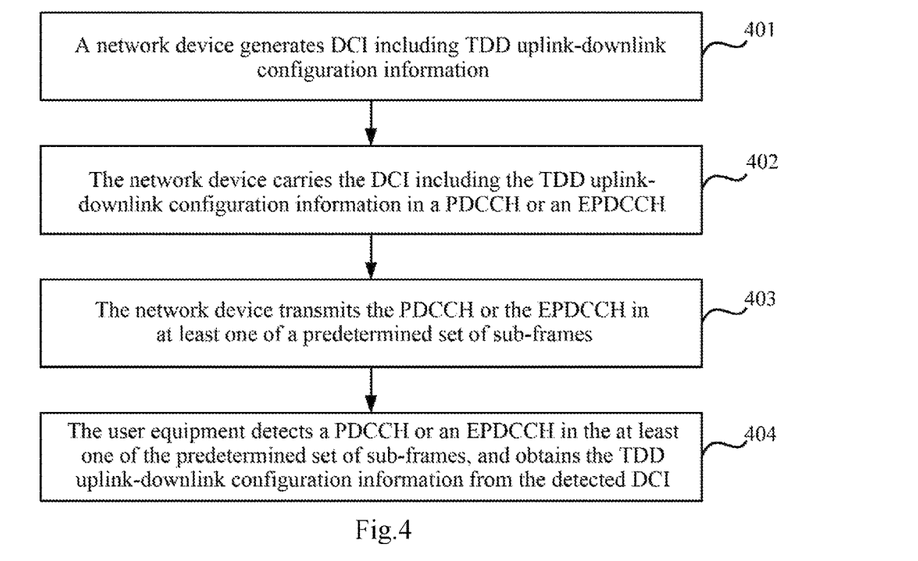
FIG. 4 is a schematic flow chart of a method for transmitting uplink-downlink configuration information according to an embodiment of the disclosure.

In view of the problem in the prior art, an embodiment of the disclosure provides a method for transmitting uplink-downlink configuration information, which can be TDD uplink-downlink configuration information. As illustrated in FIG. 4, the method includes the following operations:

In the operation 401, a network device generates DCI including TDD uplink-downlink configuration information. The network device can be a base station, an eNB, a Radio Network Controller (RNC), etc.

In the embodiment of the disclosure, the network device can generate the DCI including the TDD uplink-downlink configuration information particularly as follows without limitation thereto: the network device generates the DCI including the TDD uplink-downlink configuration information indicated in a plurality of bits in the DCI. The plurality of bits can include two bits or three bits.

The TDD uplink-downlink configuration information can be indicated in the plurality of bits in the DCI particularly as follows:

In a first implementation, if the plurality of bits include three bits in the DCI (that is, the plurality of bits in the DCI to indicate the TDD uplink-downlink configuration information is three), then one of the seven TDD uplink-downlink configurations (the seven uplink-downlink configurations in Table 3) supported in the $3^{rd}$ Generation Partnership Project (3GPP) Evolved Universal Terrestrial Radio Access (E-UTRA) is indicated in these three bits.

In a second implementation, if the plurality of bits include two bits in the DCI (that is, the plurality of bits in the DCI to indicate the TDD uplink-downlink configuration information is two), then one of the four TDD uplink-downlink configurations with a periodicity of 5 ms (the four uplink-downlink configurations with a periodicity of 5 ms in Table 3) supported in the 3GPP E-UTRA is indicated in these two bits.

In a third implementation, if the plurality of bits include two bits in the DCI (that is, the plurality of bits in the DCI to indicate the TDD uplink-downlink configuration information is two), then one of a set of TDD uplink-downlink configurations is indicated in these two bits, where the set of TDD uplink-downlink configurations includes at most four of the TDD uplink-downlink configurations supported in the 3GPP E-UTRA, and the set of TDD uplink-downlink configurations is configured in higher-layer signaling. For example, if the higher-layer signaling indicates that the current set of TDD uplink-downlink configurations includes the TDD uplink-downlink configurations with a periodicity of 5 ms supported in the 3GPP E-UTRA, then one of the four TDD uplink-downlink configurations with a periodicity of 5 ms supported in the 3GPP E-UTRA is indicated in these two bits. If the higher-layer signaling indicates that the current set of TDD uplink-downlink configurations includes the TDD uplink-downlink configurations with a periodicity of 10 ms supported in the 3GPP E-UTRA, then one of the three TDD uplink-downlink configurations with a periodicity of 10 ms supported in the 3GPP E-UTRA is indicated in these two bits.

The DCI to carry the TDD uplink-downlink configuration information, as described in the embodiment of the disclosure can be in an existing DCI format or in a DCI format different from the existing DCI format, where the length of the DCI format different from the existing DCI format is the same as or different from the length of the existing DCI format.

With the existing DCI format, a DCI format with a small length, e.g., the DCI format 1C, can be applied. With the DCI format different from the existing DCI format (i.e., with a new DCI format), if the length of the new DCI format is different from the length of the existing DCI format, then an increase in complexity of PDCCH or EPDCCH blind detection can be avoided. If the length of the new DCI format is greater than the length of the existing DCI format, for example, the length of the new DCI format is equal to the bits indicated in the uplink-downlink configuration, plus the length of the existing DCI format, then the new DCI format can not only indicate the uplink-downlink configuration information but also perform the indication function of the existing DCI format. If the length of the new DCI format is less than the length of the existing DCI format, then the indication efficiency of the DCI can be improved, and this case can be applicable to a solution to mapping DCI in a PDCCH or an EPDCCH to physical resources including REs.

It shall be noted that with the existing DCI format, in order to distinguish the information included in the DCI, a new RNTI further needs to be introduced to indicate that the related information carried in the DCI is the TDD uplink-downlink configuration information. With the new DCI formation with the same length as the existing DCI format, in order to distinguish the information included in the DCI, a new RNTI further needs to be introduced to indicate that the related information carried in the DCI is the TDD uplink-downlink configuration information.

In an embodiment, the DCI further includes X (X is greater than or equal to 1) preset bits other than the plurality of bits, where the total length, of the X preset bits and the plurality of bits indicating the TDD uplink-downlink configuration information, is equal to the length of any one of the DCI formats 0, 1, 1A, 1B, 1C, 1D, 2, 2A, 2B, 2C, 2D, 3, 3A and 4 supported in the 3GPP E-UTRA.

In another embodiment, the DCI further includes Y (Y is greater than or equal to 1) preset bits other than the plurality of bits, where the Y preset bits indicate all the information in any one of the DCI formats 0, 1, 1A, 1B, 1C, 1D, 2, 2A, 2B, 2C, 2D, 3, 3A and 4 supported in the 3GPP E-UTRA.

In another embodiment, the DCI further includes Z (Z is greater than or equal to 0) preset bits other than the plurality of bits, where the total length, of the Z preset bits and the plurality of bits indicating the TDD uplink-downlink configuration information, is smaller than the length of the shortest one of the DCI formats 0, 1, 1A, 1B, 1C, 1D, 2, 2A, 2B, 2C, 2D, 3, 3A and 4 supported in the 3GPP E-UTRA.

It shall be noted that in the embodiment of the disclosure, the preset bits included in the DCI include all-0 preset bits or all-1 preset bits.

In the operation 402, the network device carries the DCI including the TDD uplink-downlink configuration information in a PDCCH or an Enhanced Physical Downlink Control Channel (EPDCCH), where the DCI indicates the TDD uplink-downlink configuration information.

In an embodiment of the disclosure, the PDCCH or the EPDCCH refers to a PDCCH or an EPDCCH in a common search space. In another embodiment, the PDCCH or the EPDCCH refers to a PDCCH or an EPDCCH at an aggregation level higher than or equal to S, where S>1. In another embodiment, the PDCCH or the EPDCCH refers to a PDCCH or an EPDCCH with a specified logic number or one of a plurality of specified logic numbers. In this embodiment, the number of times of blind detection by the user equipment can be lowered, or even the DCI including the TDD uplink-downlink configuration information can be detected directly.

Here if the PDCCH or the EPDCCH is a PDCCH or an EPDCCH at an aggregation level higher than or equal to S, then only a part or even one of the CCE aggregation levels is applied to the DCI to indicate the TDD uplink-downlink configuration information. If only one of the CCE aggregation levels is applied to the DCI to indicate the TDD uplink-downlink configuration information, then typically the highest CCE aggregation level is applied to ensure a quality of transmission in any scenario. For example, if the TDD uplink-downlink configuration information is transmitted only in the common search space, then the CCE aggregation level 8 can be applied. If the TDD uplink-downlink configuration is applied only to a low-power node with a small coverage area, then the CCE aggregation level 4 can also be applied.

Here if the PDCCH or the EPDCCH is a PDCCH or an EPDCCH with a specified logic number, then the DCI to indicate the TDD uplink-downlink configuration information occupies only a part or even only one of PDCCH or EPDCCH positions. For example, the DCI to indicate the TDD uplink-downlink configuration information is mapped to the N-th PDCCH or EPDCCH position at each CCE aggregation level, where N<=the lowest candidate PDCCH or EPDCCH position, and typically N is 1 to avoid an unnecessary waste of the PDCCH or EPDCCH resources. In another example, the DCI to indicate the TDD uplink-downlink configuration information is mapped only to the N-th PDCCH or EPDCCH position at some CCE aggregation level in some search space, where N<=candidate PDCCH or EPDCCH positions at the aggregation level. For example, the DCI to indicate the TDD uplink-downlink configuration information can be mapped onto the first PDCCH or EPDCCH position at the CCE aggregation level in the common search space.

In the operation 403, the network device transmits the PDCCH or the EPDCCH in at least one of a predetermined set of sub-frames. Particularly the network device predetermines the set of sub-frames, and transmits the PDCCH or the EPDCCH in the at least one of the predetermined set of sub-frames, where the set of sub-frames predetermined by the network device can be a set of sub-frames determined by the network device itself or a set of sub-frames prescribed in a protocol or a set of sub-frames signaled by a higher layer.

In the embodiment of the disclosure, the set of sub-frames predetermined by the network device particularly includes but will not be limited to the M-th sub-frames in every N radio frames, where $N \geq 1$, and $1 \leq M \leq P$, and P represents the number of sub-frames included in a radio frame. For example, if N=1 and M=3, then the set of sub-frames predetermined by the network device particularly includes the third sub-frames in each radio frames; and if N=2 and m=3, then the set of sub-frames predetermined by the network device particularly includes the third sub-frames in every two radio frames.

In the embodiment of the disclosure, the network device can further transmit information about the predetermined set of sub-frames to the user equipment in higher-layer signaling after the network device predetermines the set of sub-frames.

In the operation 404, the user equipment detects a PDCCH or an EPDCCH in the at least one of the predetermined set of sub-frames, and obtains the TDD uplink-downlink configuration information from the detected DCI, where the PDCCH or the EPDCCH carries the DCI including the TDD uplink-downlink configuration information.

In the embodiment of the disclosure, the TDD uplink-downlink configuration information is indicated in a plurality of bits in the DCI, where the TDD uplink-downlink configuration information can be indicated in the plurality of bits in the DCI particularly as follows:

In a first implementation, if the plurality of bits include three bits in the DCI, then one of the seven TDD uplink-downlink configurations supported in the 3GPP E-UTRA is indicated in the three bits.

In a second implementation, if the plurality of bits include two bits in the DCI, then one of the four TDD uplink-downlink configurations with a periodicity of 5 ms supported in the 3GPP E-UTRA is indicated in the two bits.

In a third implementation, if the plurality of bits include two bits in the DCI, then one of a set of TDD uplink-downlink configurations is indicated in the two bits, where the set of TDD uplink-downlink configurations includes at most four of the TDD uplink-downlink configurations supported in the 3GPP E-UTRA.

In an embodiment, the DCI further includes X preset bits other than the plurality of bits, where the total length, of the X preset bits and the plurality of bits indicating the TDD uplink-downlink configuration information, is equal to the length of any one of the DCI formats 0, 1, 1A, 1 B, 1C, 1D, 2, 2A, 2B, 2C, 2D, 3, 3A and 4 supported in the 3GPP E-UTRA, where X is greater than or equal to 1.

In another embodiment, the DCI further includes Y preset bits other than the plurality of bits, where the Y preset bits indicate all the information in any one of the DCI formats 0, 1, 1A, 1B, 1C, 1D, 2, 2A, 2B, 2C, 2D, 3, 3A and 4 supported in the 3GPP E-UTRA, where Y is greater than or equal to 1.

In another embodiment, the DCI further includes Z preset bits other than the plurality of bits, where the total length, of the Z preset bits and the plurality of bits indicating the TDD uplink-downlink configuration information, is less than the length of the shortest one of the DCI formats 0, 1, 1A, 1B, 1C, 1D, 2, 2A, 2B, 2C, 2D, 3, 3A and 4 supported in the 3GPP E-UTRA, where Z is greater than or equal to 1.

Here the preset bits included in the DCI include all-0 preset bits or all-1 preset bits.

In an embodiment, the PDCCH or the EPDCCH refers to a PDCCH or an EPDCCH in a common search space. In another embodiment, the PDCCH or the EPDCCH refers to a PDCCH or an EPDCCH at an aggregation level higher than or equal to S, where S>1. In another embodiment, the PDCCH or the EPDCCH refers to a PDCCH or an EPDCCH with a specified logic number or one of a plurality of specified logic numbers.

In the embodiment of the disclosure, the user equipment detects the PDCCH or the EPDCCH, over which the DCI including the TDD uplink-downlink configuration information is carried, in the at least one of the predetermined set of sub-frames particularly as follows without limitation thereto: the user equipment predetermines the set of sub-frames, and detects the PDCCH or the EPDCCH, over which the DCI including the TDD uplink-downlink configuration information is carried, in the at least one of the predetermined set of sub-frames, where the set of sub-frames predetermined by the user equipment particularly includes the M-th sub-frames in every N radio frames, where N≥1, and 1≤M≤P, and P represents the number of sub-frames included in a radio frame. Here the user equipment can predetermine the set of sub-frames particularly as follows without limitation thereto: the user equipment receives information signaled by the network device about the predetermined set of sub-frames to the user equipment in higher-layer signaling.

In the embodiment of the disclosure, the user equipment detects the PDCCH or the EPDCCH, over which the DCI including the TDD uplink-downlink configuration information is carried, in the at least one of the predetermined set of sub-frames particularly as follows without limitation thereto: the user equipment detects the PDCCH or the EPDCCH, over which the DCI including the TDD uplink-downlink configuration information is carried, in the at least one of the predetermined set of sub-frames in a maximum likelihood detection algorithm.

It shall be noted that the maximum likelihood detection algorithm is an optimum detection algorithm with which a receive diversity gain can be available. If there are a small number of significant bits, then the maximum likelihood detection algorithm will be very useful. In the embodiment of the disclosure, there are two or three significant bits.

The process above will be described below in details in connection with particular examples.

In a first example, the network device indicates the TDD uplink-downlink configuration information in the DCI format 1C. Three bits in the DCI format 1C indicate the TDD uplink-downlink configuration, and the remaining bits are set to 0. The DCI format 1C is mapped onto a PDCCH or an EPDCCH. Thereafter the user equipment detects blindly a PDCCH or an EPDCCH for the DCI format 1C in which the DCI of the TDD uplink-downlink configuration information is indicated.

In a second example, the network device indicates the TDD uplink-downlink configuration information in the DCI format 1C. Three bits in the DCI format 1C indicate the TDD uplink-downlink configuration, and the remaining bits are set to 0. The network device maps the DCI format 1C into a common search space at the CCE aggregation level 4. Thereafter the user equipment detects blindly a PDCCH or an EPDCCH, at the CCE aggregation level 4 only in the common search space, for the DCI format 1C in which the DCI of the TDD uplink-downlink configuration information is indicated. The user equipment can detect the DCI format 1C for the TDD uplink-downlink configuration information in the maximum likelihood algorithm.

In a third example, the network device indicates the TDD uplink-downlink configuration information in the DCI format 1C. Three bits in the DCI format 1C indicate the TDD uplink-downlink configuration, and the remaining bits are set to 0. The network device maps the DCI format 1C onto a first resource at the CCE aggregation level 4 in a common search space at the CCE aggregation level 4. Thereafter the user equipment detects blindly a PDCCH or an EPDCCH, only over the first resource at the CCE aggregation level 4 in the common search space, for the DCI format 1C in which the DCI of the TDD uplink-downlink configuration information is indicated. The user equipment can detect the DCI format 1C for the TDD uplink-downlink configuration information in the maximum likelihood algorithm.

In summary, in the embodiments of the disclosure, the network device indicates the TDD uplink-downlink configuration information to the user equipment in the DCI, and prescribes that a part of the plurality of bits in the DCI indicate the TDD uplink-downlink configuration information, so that the user equipment can detect the DCI in the maximum likelihood algorithm with lower complexity of the maximum likelihood algorithm and improved accuracy of DCI detection, and thus the user equipment can apply the maximum likelihood algorithm for optimum detection performance. Furthermore the DCI in the PDCCH or the EPDCCH can be mapped to the physical resources including the REs to thereby lower the complexity in searching by the user equipment for the specific DCI so as to improve the efficiency of the search.

Figure 5:
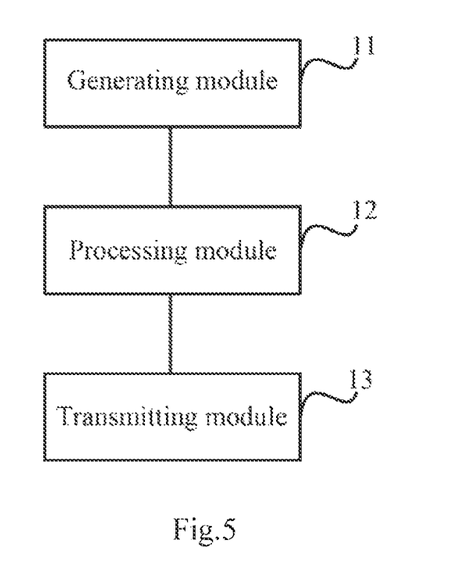
FIG. 5 is a schematic structural diagram of a network device according to an embodiment of the disclosure.

An embodiment of the disclosure further provides a network device as illustrated in FIG. 5, which includes:

A generating module 11 is configured to generate Downlink Control Information (DCI) including Time Division Duplex (TDD) uplink-downlink configuration information;

A processing module 12 is configured to carry the DCI including the TDD uplink-downlink configuration information in a Physical Downlink Control Channel (PDCCH) or an Enhanced Physical Downlink Control Channel (EPDCCH); and A transmitting module 13 is configured to transmit the PDCCH or the EPDCCH in at least one of a predetermined set of sub-frames.

In an embodiment of the disclosure, the generating module 11 is configured to generate the DCI including the TDD uplink-downlink configuration information by indicating the TDD uplink-downlink configuration information in a plurality of bits in the DCI.

In an embodiment, if the plurality of bits include three bits in the DCI, then one of the seven TDD uplink-downlink configurations supported in the $3^{rd}$ Generation Partnership Project (3GPP) Evolved Universal Terrestrial Radio Access (E-UTRA) is indicated in the three bits.

In another embodiment, if the plurality of bits include two bits in the DCI, then one of the four TDD uplink-downlink configurations with a periodicity of 5 ms supported in the 3GPP E-UTRA is indicated in the two bits.

In another embodiment, if the plurality of bits include two bits in the DCI, then one of a set of TDD uplink-downlink configurations is indicated in the two bits, where the set of TDD uplink-downlink configurations includes at most four of the TDD uplink-downlink configurations supported in the 3GPP E-UTRA.

In an embodiment, the DCI generated by the generating module 11 further includes X preset bits other than the plurality of bits, where the total length, of the X preset bits and the plurality of bits indicating the TDD uplink-downlink configuration information, is equal to the length of any one of the DCI formats 0, 1, 1A, 1B, 1C, 1D, 2, 2A, 2B, 2C, 2D, 3, 3A and 4 supported in the 3GPP E-UTRA, where X is greater than or equal to 1.

In another embodiment, the DCI generated by the generating module 11 further includes Y preset bits other than the plurality of bits, where the Y preset bits indicate all the information in any one of the DCI formats 0, 1, 1A, 1B, 1C, 1D, 2, 2A, 2B, 2C, 2D, 3, 3A and 4 supported in the 3GPP E-UTRA, where Y is greater than or equal to 1.

In another embodiment, the DCI generated by the generating module 11 further includes Z preset bits other than the plurality of bits, where the total length, of the Z preset bits and the plurality of bits indicating the TDD uplink-downlink configuration information, is smaller than the length of the shortest one of the DCI formats 0, 1, 1A, 1B, 1C, 1D, 2, 2A, 2B, 2C, 2D, 3, 3A and 4 supported in the 3GPP E-UTRA, where Z is greater than or equal to 0.

The preset bits included in the DCI generated by the generating module 11 include all-0 preset bits or all-1 preset bits.

In an embodiment, the PDCCH or the EPDCCH refers to a PDCCH or an EPDCCH in a common search space; or The PDCCH or the EPDCCH refers to a PDCCH or an EPDCCH at an aggregation level higher than or equal to S, where S>1; or The PDCCH or the EPDCCH refers to a PDCCH or an EPDCCH with a specified logic number or one of a plurality of specified logic numbers.

The transmitting module 13 is configured to predetermine the set of sub-frames, and to transmit the PDCCH or the EPDCCH in the at least one of the predetermined set of sub-frames.

The transmitting module 13 is configured to predetermine the set of sub-frames including the M-th sub-frames in every N radio frames, where N≥1, and 1≤M≤P, and P represents the number of sub-frames included in a radio frame.

The transmitting module 13 is further configured to transmit information about the predetermined set of sub-frames to a user equipment in higher-layer signaling after predetermining the set of sub-frames.

Here the respective modules of the device according to the embodiment of the disclosure can be integrated together or can be deployed separately. The respective modules above can be combined into a single module or can be subdivided into a plurality of sub-modules.

Figure 6:
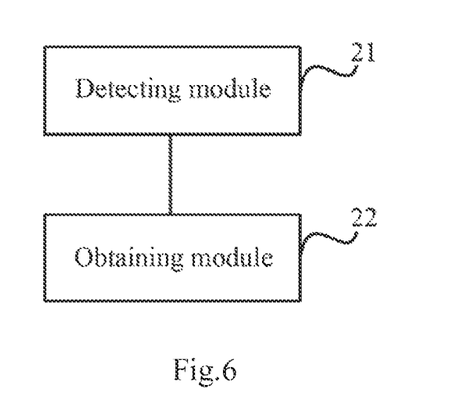
FIG. 6 is a schematic structural diagram of a user equipment according to an embodiment of the disclosure.

An embodiment of the disclosure further provides a user equipment as illustrated in FIG. 6, which includes:

A detecting module 21 is configured to detect a Physical Downlink Control Channel (PDCCH) or an Enhanced Physical Downlink Control Channel (EPDCCH) in at least one of a predetermined set of sub-frames, where the PDCCH or the EPDCCH carries Downlink Control Information (DCI) including Time Division Duplex (TDD) uplink-downlink configuration information; and An obtaining module 22 is configured to obtain the TDD uplink-downlink configuration information from the detected DCI.

The TDD uplink-downlink configuration information is indicated in a plurality of bits in the DCI.

In an embodiment, if the plurality of bits include three bits in the DCI, then one of the seven TDD uplink-downlink configurations supported in the $3^{rd}$ Generation Partnership Project (3GPP) Evolved Universal Terrestrial Radio Access (E-UTRA) is indicated in the three bits.

In another embodiment, if the plurality of bits include two bits in the DCI, then one of the four TDD uplink-downlink configurations with a periodicity of 5 ms supported in the 3GPP E-UTRA is indicated in the two bits.

In another embodiment, if the plurality of bits include two bits in the DCI, then one of a set of TDD uplink-downlink configurations is indicated in the two bits, where the set of TDD uplink-downlink configurations includes at most four of the TDD uplink-downlink configurations supported in the 3GPP E-UTRA.

In an embodiment, the DCI further includes X preset bits other than the plurality of bits, where the total length, of the X preset bits and the plurality of bits indicating the TDD uplink-downlink configuration information, is equal to the length of any one of the DCI formats 0, 1, 1A, 1B, 1C, 1D, 2, 2A, 2B, 2C, 2D, 3, 3A and 4 supported in the 3GPP E-UTRA, where X is greater than or equal to 1.

In another embodiment, the DCI further includes Y preset bits other than the plurality of bits, where the Y preset bits indicate all the information in any one of the DCI formats 0, 1, 1A, 1B, 1C, 1D, 2, 2A, 2B, 2C, 2D, 3, 3A and 4 supported in the 3GPP E-UTRA, where Y is greater than or equal to 1.

In another embodiment, the DCI further includes Z preset bits other than the plurality of bits, where the total length, of the Z preset bits and the plurality of bits indicating the TDD uplink-downlink configuration information, is smaller than the length of the shortest one of the DCI formats 0, 1, 1A, 1B, 1C, 1D, 2, 2A, 2B, 2C, 2D, 3, 3A and 4 supported in the 3GPP E-UTRA, where Z is greater than or equal to 0.

The preset bits included in the DCI include all-0 preset bits or all-1 preset bits.

In an embodiment, the PDCCH or the EPDCCH refers to a PDCCH or an EPDCCH in a common search space; or The PDCCH or the EPDCCH refers to a PDCCH or an EPDCCH at an aggregation level higher than or equal to S, where S>1; or The PDCCH or the EPDCCH refers to a PDCCH or an EPDCCH with a specified logic number or one of a plurality of specified logic numbers.

The predetermined set of sub-frames includes the M-th sub-frames in every N radio frames, where N≥1, and 1≤M≤P, and P represents the number of sub-frames included in a radio frame.

The detecting module 21 is further configured to receive information signaled by a network device about the predetermined set of sub-frames to the user equipment in higher-layer signaling.

The detecting module 21 is further configured to detect the PDCCH or the EPDCCH, over which the DCI including the TDD uplink-downlink configuration information is carried, in the at least one of the predetermined set of sub-frames in a maximum likelihood detection algorithm.

Here the respective modules of the device according to the embodiment of the disclosure can be integrated together or can be deployed separately. The respective modules above can be combined into a single module or can be subdivided into a plurality of sub-modules.

Figure 7:
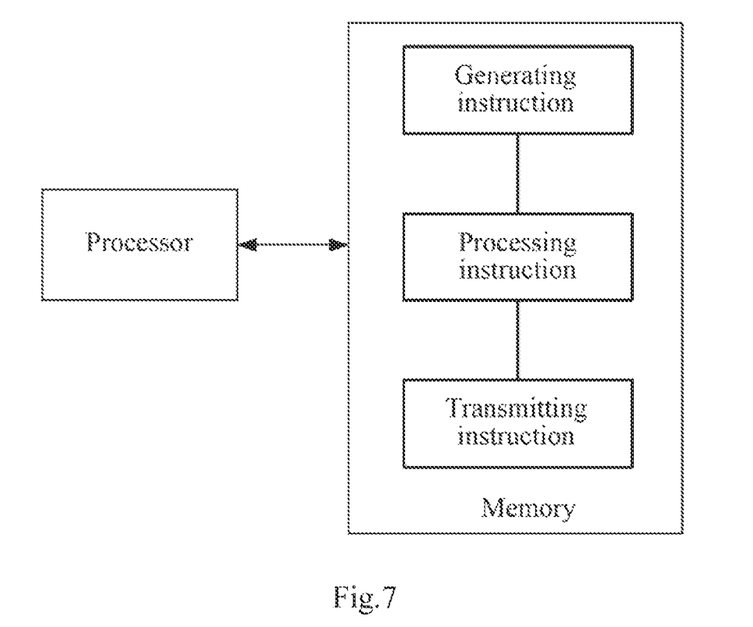
FIG. 7 is a schematic structural diagram of a network device according to another embodiment of the disclosure.

FIG. 7 is a schematic structural diagram of a network device according to another embodiment of the disclosure. The network device includes at least a memory, and a processor communicating with the memory, where the memory includes a generating instruction, a processing instruction, and a transmitting instruction, which can be executed by the processor. The memory can be a nonvolatile computer readable storage medium, and the generating instruction, the processing instruction, and the transmitting instruction can be machine readable instructions stored in the memory. The processor can execute the machine readable instructions stored in the memory The generating instruction is configured to generate Downlink Control Information (DCI) including Time Division Duplex (TDD) uplink-downlink configuration information;

The processing instruction is configured to carry the DCI including the TDD uplink-downlink configuration information in a Physical Downlink Control Channel (PDCCH) or an Enhanced Physical Downlink Control Channel (EPDCCH); and The transmitting instruction is configured to transmit the PDCCH or the EPDCCH in at least one of a predetermined set of sub-frames.

The generating instruction is configured to generate the DCI including the TDD uplink-downlink configuration information by indicating the TDD uplink-downlink configuration information in a plurality of bits in the DCI.

In an embodiment, if the plurality of bits include three bits in the DCI, then one of the seven TDD uplink-downlink configurations supported in the $3^{rd}$ Generation Partnership Project (3GPP) Evolved Universal Terrestrial Radio Access (E-UTRA) is indicated in the three bits.

In another embodiment, if the plurality of bits include two bits in the DCI, then one of the four TDD uplink-downlink configurations with a periodicity of 5 ms supported in the 3GPP E-UTRA is indicated in the two bits.

In another embodiment, if the plurality of bits include two bits in the DCI, then one of a set of TDD uplink-downlink configurations is indicated in the two bits, where the set of TDD uplink-downlink configurations includes at most four of the TDD uplink-downlink configurations supported in the 3GPP E-UTRA.

In an embodiment, the DCI generated by the generating instruction further includes X preset bits other than the plurality of bits, where the total length, of the X preset bits and the plurality of bits indicating the TDD uplink-downlink configuration information, is equal to the length of any one of the DCI formats 0, 1, 1A, 1B, 1C, 1D, 2, 2A, 2B, 2C, 2D, 3, 3A and 4 supported in the 3GPP E-UTRA, where X is greater than or equal to 1.

In another embodiment, the DCI generated by the generating instruction further includes Y preset bits other than the plurality of bits, where the Y preset bits indicate all the information in any one of the DCI formats 0, 1, 1A, 1B, 1C, 1D, 2, 2A, 2B, 2C, 2D, 3, 3A and 4 supported in the 3GPP E-UTRA, where Y is greater than or equal to 1.

In another embodiment, the DCI generated by the generating instruction further includes Z preset bits other than the plurality of bits, where the total length, of the Z preset bits and the plurality of bits indicating the TDD uplink-downlink configuration information, is smaller than the length of the shortest one of the DCI formats 0, 1, 1A, 1B, 1C, 1D, 2, 2A, 2B, 2C, 2D, 3, 3A and 4 supported in the 3GPP E-UTRA, where Z is greater than or equal to 0.

The preset bits included in the DCI generated by the generating instruction include all-0 preset bits or all-1 preset bits.

In an embodiment, the PDCCH or the EPDCCH refers to a PDCCH or an EPDCCH in a common search space; or The PDCCH or the EPDCCH refers to a PDCCH or an EPDCCH at an aggregation level higher than or equal to S, where S>1; or The PDCCH or the EPDCCH refers to a PDCCH or an EPDCCH with a specified logic number or one of a plurality of specified logic numbers.

The transmitting instruction is configured to predetermine the set of sub-frames including the M-th sub-frames in every N radio frames, where N≥1, and 1≤M≤P, and P represents the number of sub-frames included in a radio frame.

The transmitting instruction is further configured to transmit information about the predetermined set of sub-frames to a user equipment in higher-layer signaling after predetermining the set of sub-frames.

Figure 8:
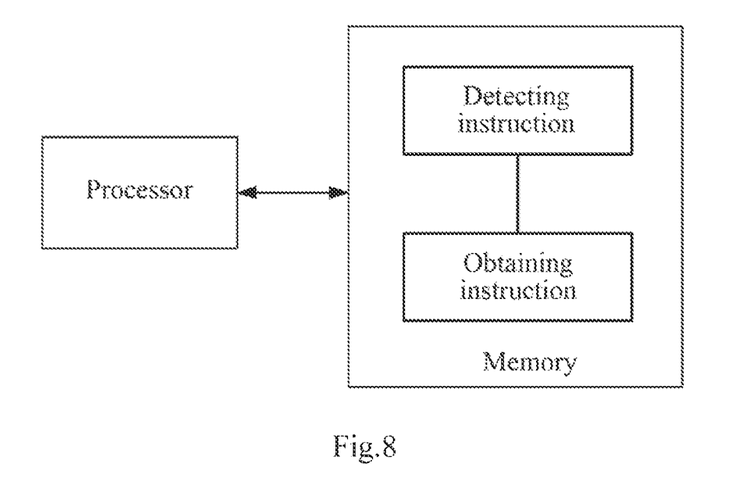
FIG. 8 is a schematic structural diagram of a user equipment according to another embodiment of the disclosure.

FIG. 8 is a schematic structural diagram of a user equipment according to another embodiment of the disclosure. The user equipment includes at least a memory, and a processor communicating with the memory, where the memory includes a detecting instruction, and an obtaining instruction, which can be executed by the processor. The memory can be a nonvolatile computer readable storage medium, and the detecting instruction and the obtaining instruction can be machine readable instructions stored in the memory. The processor can execute the machine readable instructions stored in the memory.

The detecting instruction is configured to detect a Physical Downlink Control Channel (PDCCH) or an Enhanced Physical Downlink Control Channel (EPDCCH) in at least one of a predetermined set of sub-frames, where the PDCCH or the EPDCCH carries Downlink Control Information (DCI) including Time Division Duplex (TDD) uplink-downlink configuration information; and The obtaining instruction is configured to obtain the TDD uplink-downlink configuration information from the detected DCI.

The TDD uplink-downlink configuration information is indicated in a plurality of bits in the DCI.

In an embodiment, if the plurality of bits include three bits in the DCI, then one of the seven TDD uplink-downlink configurations supported in the 3rd Generation Partnership Project (3GPP) Evolved Universal Terrestrial Radio Access (E-UTRA) is indicated in the three bits.

In another embodiment, if the plurality of bits include two bits in the DCI, then one of the four TDD uplink-downlink configurations with a periodicity of 5 ms supported in the 3GPP E-UTRA is indicated in the two bits.

In another embodiment, if the plurality of bits include two bits in the DCI, then one of a set of TDD uplink-downlink configurations is indicated in these two bits, where the set of TDD uplink-downlink configurations includes at most four of the TDD uplink-downlink configurations supported in the 3GPP E-UTRA.

In an embodiment, the DCI further includes X preset bits other than the plurality of bits, where the total length, of the X preset bits and the plurality of bits indicating the TDD uplink-downlink configuration information, is equal to the length of any one of the DCI formats 0, 1, 1A, 1B, 1C, 1D, 2, 2A, 2B, 2C, 2D, 3, 3A and 4 supported in the 3GPP E-UTRA, where X is greater than or equal to 1.

In another embodiment, the DCI further includes Y preset bits other than the plurality of bits, where the Y preset bits indicate all the information in any one of the DCI formats 0, 1, 1A, 1B, 1C, 1D, 2, 2A, 2B, 2C, 2D, 3, 3A and 4 supported in the 3GPP E-UTRA, where Y is greater than or equal to 1.

In another embodiment, the DCI further includes Z preset bits other than the plurality of bits, where the total length, of the Z preset bits and the plurality of bits indicating the TDD uplink-downlink configuration information, is smaller than the length of the shortest one of the DCI formats 0, 1, 1A, 1B, 1C, 1D, 2, 2A, 2B, 2C, 2D, 3, 3A and 4 supported in the 3GPP E-UTRA, where Z is greater than or equal to 0.

The preset bits included in the DCI include all-0 preset bits or all-1 preset bits.

In an embodiment, the PDCCH or the EPDCCH refers to a PDCCH or an EPDCCH in a common search space; or The PDCCH or the EPDCCH refers to a PDCCH or an EPDCCH at an aggregation level higher than or equal to S, where S>1; or The PDCCH or the EPDCCH refers to a PDCCH or an EPDCCH with a specified logic number or one of a plurality of specified logic numbers.

The predetermined set of sub-frames includes the M-th sub-frames in every N radio frames, where N≥1, and 1≤M≤P, and P represents the number of sub-frames included in a radio frame.

The detecting instruction is further configured to receive information signaled by a network device about the predetermined set of sub-frames to the user equipment in higher-layer signaling.

The detecting instruction is further configured to detect the PDCCH or the EPDCCH, over which the DCI including the TDD uplink-downlink configuration information is carried, in the at least one of the predetermined set of sub-frames in a maximum likelihood detection algorithm.

Those ordinarily skilled in the art can clearly appreciate from the foregoing description of the embodiments that the disclosure can be implemented in software plus a necessary general hardware platform or, of course, in hardware, although the former implementation may be preferred in many cases. Based upon such understanding, the technical solutions of the disclosure in essence or the part thereof contributing to the prior art can be embodied in the form of a software product, which can be stored in a storage medium, and which includes several instructions to cause a terminal device (e.g., a mobile phone, a personal computer, a server, a network device, etc.) to perform the methods according to the respective embodiments of the disclosure.

Those ordinarily skilled in the art can appreciate that all or a part of the flows in the method according to the embodiments above can be performed by machine readable instructions stored in a computer readable storage medium to instruct relevant hardware. The machine readable instructions can be executed to perform the flows of the embodiments of the respective methods above, and the storage medium can be a magnetic disk, an optical disk, a Read-Only Memory (ROM), a Random Access Memory (RAM), etc.

The drawings in the embodiments of the disclosure are merely illustrative of some of the embodiments, and one or more of the modules and the operations illustrated therein may not be essential to the disclosure. The modules can be combined into a single module or subdivided into a plurality of sub-modules.

The foregoing disclosure is merely illustrative of the preferred embodiments of the disclosure but not intended to limit the scope of the disclosure as claimed. It shall be noted that those ordinarily skilled in the art can further make several modifications and variations without departing from the principle of the embodiments of the disclosure and that these modifications and variations shall also be construed as falling into the scope of the disclosure as claimed.

The invention claimed is:

1. A method for transmitting uplink-downlink configuration information, the method comprising:
generating, by a network device, Downlink Control Information, DCI, comprising Time Division Duplex, TDD, uplink-downlink configuration information;
using, by the network device, a Physical Downlink Control Channel, PDCCH, or an Enhanced Physical Downlink Control Channel, EPDCCH to carry the DCI comprising the TDD uplink-downlink configuration information; and
transmitting, by the network device, the PDCCH or the EPDCCH in at least one of a predetermined set of sub-frames;
wherein the PDCCH or the EPDCCH refers to a PDCCH or an EPDCCH with a specified logic number or one of a plurality of specified logic numbers, the DCI for indicating the TDD uplink-downlink configuration information is mapped to a N-th PDCCH or EPDCCH position at each CCE aggregation level, where N≤a lowest candidate PDCCH or EPDCCH position, or,
the DCI for indicating the TDD uplink-downlink configuration information is mapped only to a N-th PDCCH or EPDCCH position at a first CCE aggregation level, where N≤candidate PDCCH or EPDCCH positions at the first aggregation level, or
the DCI for indicating the TDD uplink-downlink configuration information is mapped only to a N-th PDCCH or EPDCCH position at a first CCE aggregation level in a first search space, where N≤candidate PDCCH or EPDCCH positions at the first aggregation level.

2. The method of claim 1, wherein generating, by the network device, the Downlink Control Information, DCI, comprising the Time Division Duplex, TDD, uplink-downlink configuration information comprises:
generating, by the network device, the DCI comprising the TDD uplink-downlink configuration information by indicating the TDD uplink-downlink configuration information in a plurality of bits in the DCI.

3. The method of claim 2, wherein:
the DCI further comprises X preset bits other than the plurality of bits, wherein the total length, of the X preset bits and the plurality of bits indicating the TDD uplink-downlink configuration information, is equal to the length of any one of the DCI formats 0, 1, 1A, 1B, 1C, 1D, 2, 2A, 2B, 2C, 2D, 3, 3A and 4 supported in the 3GPP E-UTRA, wherein X is greater than or equal to 1; or
the DCI further comprises Y preset bits other than the plurality of bits, wherein the Y preset bits indicating all the information in any one of the DCI formats 0, 1, 1A, 1B, 1C, 1D, 2, 2A, 2B, 2C, 2D, 3, 3A and 4 supported in the 3GPP E-UTRA, wherein Y is greater than or equal to 1; or
the DCI further comprises Z preset bits other than the plurality of bits, wherein the total length, of the Z preset bits and the plurality of bits indicating the TDD uplink-downlink configuration information, is smaller than the length of the shortest one of the DCI formats 0, 1, 1A, 1B, 1C, 1D, 2, 2A, 2B, 2C, 2D, 3, 3A and 4 supported in the 3GPP E-UTRA, wherein Z is greater than or equal to 0.

4. The method of claim 3, wherein the preset bits comprised in the DCI comprise all-0 preset bits or all-1 preset bits.

5. The method of claim 1, wherein the set of sub-frames is predetermined by the network device and comprises a M-th sub-frames in every N radio frames, wherein N≥1, and 1≤M≤P, and P represents a number of sub-frames comprised in a radio frame.

6. The method of claim 5, wherein the method further comprises: transmitting, by the network device, information about the predetermined set of sub-frames to a user equipment in higher-layer signaling.

7. A method for transmitting uplink-downlink configuration information, the method comprising:
    detecting, by a user equipment, a Physical Downlink Control Channel, PDCCH, or an Enhanced Physical Downlink Control Channel, EPDCCH, in at least one of a predetermined set of sub-frames, wherein the PDCCH or the EPDCCH carries Downlink Control Information (DCI) comprising Time Division Duplex, TDD, uplink-downlink configuration information; and
    obtaining, by the user equipment, the TDD uplink-downlink configuration information from the detected DCI;
    wherein the PDCCH or the EPDCCH refers to a PDCCH or an EPDCCH with a specified logic number or one of a plurality of specified logic numbers, the DCI for indicating the TDD uplink-downlink configuration information is mapped to a N-th PDCCH or EPDCCH position at each CCE aggregation level, where N≤a lowest candidate PDCCH or EPDCCH position, or,
    the DCI for indicating the TDD uplink-downlink configuration information is mapped only to a N-th PDCCH or EPDCCH position at a first CCE aggregation level, where N≤candidate PDCCH or EPDCCH positions at the first aggregation level, or
    the DCI for indicating the TDD uplink-downlink configuration information is mapped only to a N-th PDCCH or EPDCCH position at a first CCE aggregation level in a first search space, where N≤candidate PDCCH or EPDCCH positions at the first aggregation level.

8. The method of claim 7, wherein the TDD uplink-downlink configuration information is indicated in a plurality of bits in the DCI.

9. The method of claim 8, wherein:
    the DCI further comprises X preset bits other than the plurality of bits, wherein the total length, of the X preset bits and the plurality of bits indicating the TDD uplink-downlink configuration information, is equal to the length of any one of the DCI formats 0, 1, 1A, 1B, 1C, 1D, 2, 2A, 2B, 2C, 2D, 3, 3A and 4 supported in the 3GPP E-UTRA, wherein X is greater than or equal to 1; or
    the DCI further comprises Y preset bits other than the plurality of bits, wherein the Y preset bits indicate all the information in any one of the DCI formats 0, 1, 1A, 1B, 1C, 1D, 2, 2A, 2B, 2C, 2D, 3, 3A and 4 supported in the 3GPP E-UTRA, wherein Y is greater than or equal to 1; or
    the DCI further comprises Z preset bits other than the plurality of bits, wherein the total length, of the Z preset bits and the plurality of bits indicating the TDD uplink-downlink configuration information, is smaller than the length of the shortest one of the DCI formats 0, 1, 1A, 1B, 1C, 1D, 2, 2A, 2B, 2C, 2D, 3, 3A and 4 supported in the 3GPP E-UTRA, wherein Z is greater than or equal to 1.

10. The method of claim 9, wherein the preset bits comprised in the DCI comprise all-0 preset bits or all-1 preset bits.

11. The method of claim 7, wherein the predetermined set of sub-frames comprises a M-th sub-frames in every N radio frames, wherein N≥1, and 1≤M≤P, and P represents a number of sub-frames comprised in a radio frame.

12. The method of claim 11, wherein the method further comprises: receiving, by the user equipment, information signaled by a network device about the predetermined set of sub-frames to the user equipment in higher-layer signaling.

13. A network device, comprising:
    at least a memory, and a processor communicating with the memory;
    wherein the memory comprises a generating instruction, a processing instruction, and a transmitting instruction, which can be executed by the processor;
    the memory is a nonvolatile computer readable storage medium, and the generating instruction, the processing instruction, and the transmitting instruction are machine readable instructions stored in the memory;
    the processor executes the machine readable instructions stored in the memory;
    the generating instruction is configured to generate Downlink Control Information, DCI, comprising Time Division Duplex, TDD, uplink-downlink configuration information;
    the processing instruction is configured to use a Physical Downlink Control Channel, PDCCH, or an Enhanced Physical Downlink Control Channel, EPDCCH to carry the DCI comprising the TDD uplink-downlink configuration information; and
    the transmitting instruction is configured to transmit the PDCCH or the EPDCCH in at least one of a predetermined set of sub-frames; wherein the PDCCH or the EPDCCH refers to a PDCCH or an EPDCCH with a specified logic number or one of a plurality of specified logic numbers, the DCI for indicating the TDD uplink-downlink configuration information is mapped to a N-th PDCCH or EPDCCH position at each CCE aggregation level, where N≤a lowest candidate PDCCH or EPDCCH position, or,
    the DCI for indicating the TDD uplink-downlink configuration information is mapped only to a N-th PDCCH or EPDCCH position at a first CCE aggregation level, where N≤candidate PDCCH or EPDCCH positions at the first aggregation level, or
    the DCI for indicating the TDD uplink-downlink configuration information is mapped only to a N-th PDCCH or EPDCCH position at a first CCE aggregation level in a first search space, where N≤candidate PDCCH or EPDCCH positions at the first aggregation level.

14. The network device of claim 13, wherein:
    the generating instruction is configured to generate the DCI comprising the TDD uplink-downlink configuration information by indicating the TDD uplink-downlink configuration information in a plurality of bits in the DCI.

15. The network device of claim 14, wherein the DCI generated by the generating instruction further comprises X preset bits other than the plurality of bits, wherein the total length, of the X preset bits and the plurality of bits indicating the TDD uplink-downlink configuration information, is equal to the length of any one of the DCI formats 0, 1, 1A, 1B, 1C, 1D, 2, 2A, 2B, 2C, 2D, 3, 3A and 4 supported in the 3GPP E-UTRA, wherein X is greater than or equal to 1; or
    the DCI generated by the generating instruction further comprises Y preset bits other than the plurality of bits, wherein the Y preset bits indicate all the information in any one of the DCI formats 0, 1, 1A, 1B, 1C, 1D, 2, 2A, 2B, 2C, 2D, 3, 3A and 4 supported in the 3GPP E-UTRA, wherein Y is greater than or equal to 1; or the DCI generated by the generating instruction further comprises Z preset bits other than the plurality of bits, wherein the total length, of the Z preset bits, and the plurality of bits indicating the TDD uplink-downlink configuration information, is smaller than the length of the shortest one of the DCI formats 0, 1, 1A, 1B, 1C, 1D, 2, 2A, 2B, 2C, 2D, 3, 3A and 4 supported in the 3GPP E-UTRA, wherein Z is greater than or equal to 0.

16. A user equipment, comprising:
at least a memory, and a processor communicating with the memory;
wherein the memory comprises a detecting instruction, and an obtaining instruction, which can be executed by the processor;
the memory is a nonvolatile computer readable storage medium, and the detecting instruction and the obtaining instruction are machine readable instructions stored in the memory;
the processor executes the machine readable instructions stored in the memory;
the detecting instruction is configured to detect a Physical Downlink Control Channel, PDCCH, or an Enhanced Physical Downlink Control Channel, EPDCCH, in at least one of a predetermined set of sub-frames, wherein the PDCCH or the EPDCCH carries Downlink Control Information, DCI, comprising Time Division Duplex, TDD, uplink-downlink configuration information; and
the obtaining instruction is configured to obtain the TDD uplink-downlink configuration information from the detected DCI;
wherein the PDCCH or the EPDCCH refers to a PDCCH or an EPDCCH with a specified logic number or one of a plurality of specified logic numbers, the DCI for indicating the TDD uplink-downlink configuration information is mapped to a N-th PDCCH or EPDCCH position at each CCE aggregation level, where N≤a lowest candidate PDCCH or EPDCCH position, or, the DCI for indicating the TDD uplink-downlink configuration information is mapped only to a N-th PDCCH or EPDCCH position at a first CCE aggregation level, where N≤candidate PDCCH or EPDCCH positions at the first aggregation level, or the DCI for indicating the TDD uplink-downlink configuration information is mapped only to a N-th PDCCH or EPDCCH position at a first CCE aggregation level in a first search space, where N≤candidate PDCCH or EPDCCH positions at the first aggregation level.

17. The user equipment of claim 16, wherein the TDD uplink-downlink configuration information is indicated in a plurality of bits in the DCI.

18. The user equipment of claim 17, wherein:
the DCI further comprises X preset bits other than the plurality of bits, wherein the total length, of the X preset bits and the plurality of bits indicating the TDD uplink-downlink configuration information, is equal to the length of any one of the DCI formats 0, 1, 1A, 1B, 1C, 1D, 2, 2A, 2B, 2C, 2D, 3, 3A and 4 supported in the 3GPP E-UTRA, wherein X is greater than or equal to 1; or the DCI further comprises Y preset bits other than the plurality of bits, wherein the Y preset bits indicate all the information in any one of the DCI formats 0, 1, 1A, 1B, 1C, 1D, 2, 2A, 2B, 2C, 2D, 3, 3A and 4 supported in the 3GPP E-UTRA, wherein Y is greater than or equal to 1; or the DCI further comprises Z preset bits other than the plurality of bits, wherein the total length, of the Z preset bits and the plurality of bits indicating the TDD uplink-downlink configuration information, is smaller than the length of the shortest one of the DCI formats 0, 1, 1A, 1B, 1C, 1D, 2, 2A, 2B, 2C, 2D, 3, 3A and 4 supported in the 3GPP E-UTRA, wherein Z is greater than or equal to 0.

* * * * *